United States Patent [19]

Muzio

[11] Patent Number: 6,056,276
[45] Date of Patent: May 2, 2000

[54] LEAF SPRING FOR A SUSPENSION OF A VEHICLE

[75] Inventor: Carlo Muzio, Ivrea, Italy

[73] Assignee: Rejna S.p.A., Milan, Italy

[21] Appl. No.: 09/110,404

[22] Filed: Jul. 6, 1998

[30] Foreign Application Priority Data

Jul. 4, 1997 [IT] Italy .................................. TO97A0597

[51] Int. Cl.⁷ .................................................. B60G 11/02
[52] U.S. Cl. ........................... 267/36.1; 267/148; 267/30; 267/44; 267/47
[58] Field of Search ........................... 267/164, 30, 36.1, 267/44, 47, 148

[56] References Cited

U.S. PATENT DOCUMENTS

| | | | |
|---|---|---|---|
| 4,489,922 | 12/1984 | Fesko | ....................................... 267/149 |
| 4,519,591 | 5/1985 | Bush et al. | . |
| 4,887,802 | 12/1989 | Wilcox | ..................................... 267/148 |

FOREIGN PATENT DOCUMENTS

| | | |
|---|---|---|
| 0248603 | 12/1987 | European Pat. Off. . |
| 3236330 | 5/1983 | Germany . |
| 2235033 | 2/1991 | United Kingdom . |

OTHER PUBLICATIONS

Patent abstracts of Japan, vol. 004, No. 128, publication No. 55086934, published Jan. 7, 1980.
Patent abstracts of Japan, vol. 004, No. 076, publication No. 55036644, published Mar. 14, 1980.
Patent abstracts of Japan, vol. 013, No. 469, publication No. 01182641, published Jul. 20, 1989.
Patent abstracts of Japan, vol. 006, No. 193, publication No. 57101139, published Jun. 23,1982.
Patent abstracts of Japan, vol. 009, No. 249, publication No. 60101333, published Jun. 5, 1985.

*Primary Examiner*—Christopher P. Schwartz
*Assistant Examiner*—Devon Kramer
*Attorney, Agent, or Firm*—Finnegan, Henderson, Farabow, Garrett & Dunner, L.L.P.

[57] ABSTRACT

Leaf spring, in particular for a suspension of a vehicle, of the multiple-leaf type, and preferably of the double-leaf type: a first, upper leaf is provided at respective ends with corresponding eyelets for attachment to a vehicle, and is made of metal material, for example of steel, whereas a second leaf which is connected to a lower surface of the first leaf, is made of composite material, for example of plastic reinforced with fiber glass. The attachment eyelets, which are produced by plastic deformation of the ends of the first leaf, are disposed entirely on one side of a longitudinal axis of symmetry of the first leaf, on the side opposite the second leaf; the second leaf extends longitudinally with its own respective end edges at least as far as the geometric centers of the eyelets. Between the leaves, in the vicinity of the eyelets and partially below the latter, there are interposed two friction buffers with a predetermined thickness, which are coupled to the lower leaf by means of a coupling tooth. Relative sliding of the leaves is prevented by a central bolt, whereas their relative rotation is prevented by a bracket substantially in the shape of a "U", which is disposed in the vicinity of one of the eyelets.

10 Claims, 1 Drawing Sheet

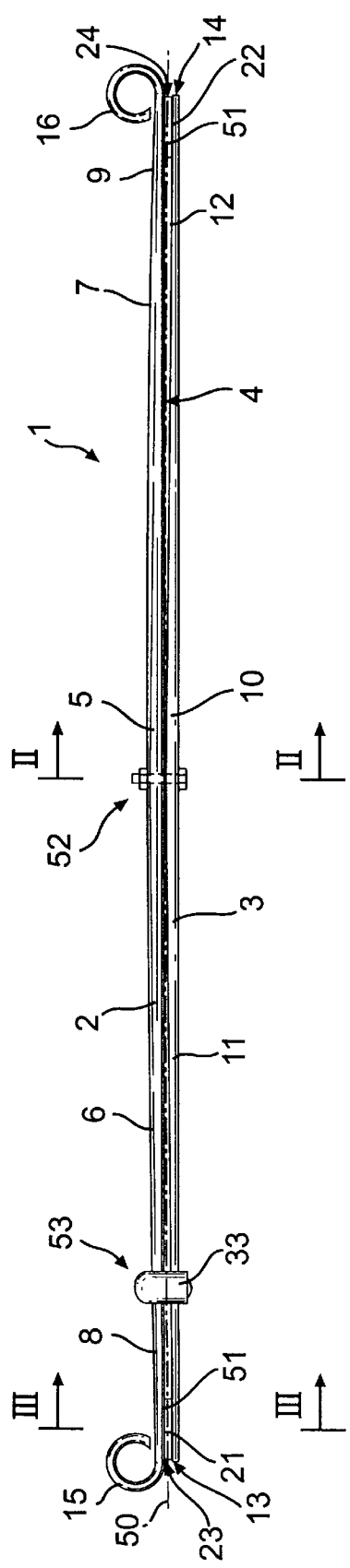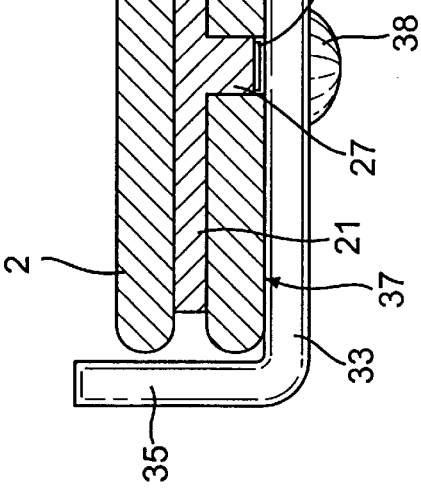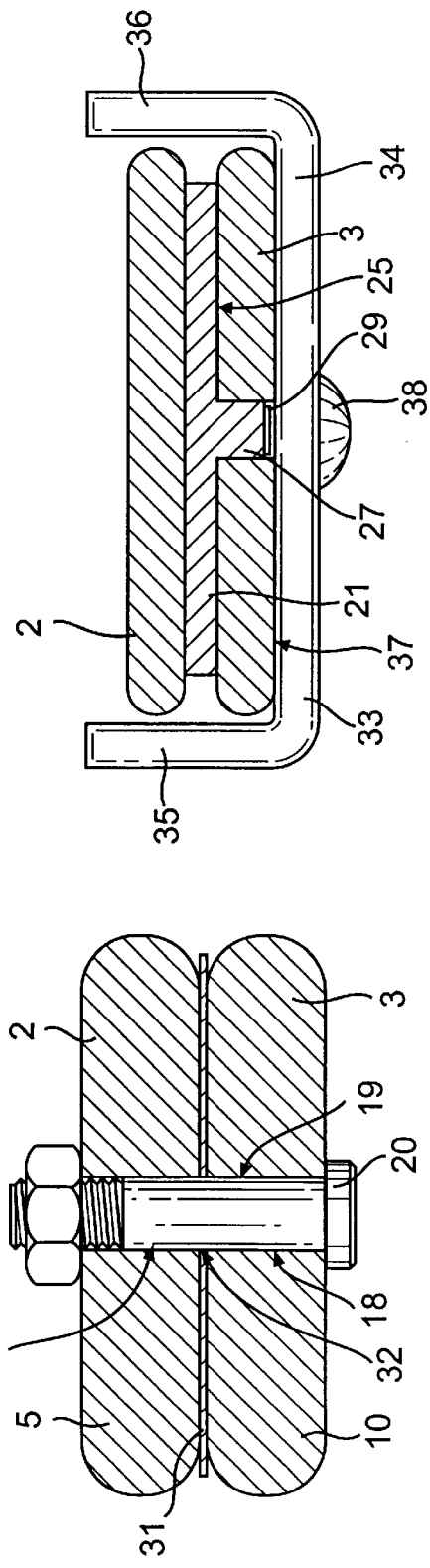

LEAF SPRING FOR A SUSPENSION OF A VEHICLE

BACKGROUND OF THE INVENTION

The present invention relates to an improved-type leaf spring, in particular for a suspension of a commercial vehicle.

Use of leaf springs is widely known, in particular in the field of suspensions for commercial vehicles. There are known leaf springs which have a single leaf or sheet (single-leaf), and composite leaf-springs (multiple-leaf, consisting of a set of superimposed leaves, which are particularly suitable for heavy loads, and which, compared with the other types of springs, are characterised by their considerable self-shock-absorbing capacity.

Single-leaf leaf springs and the upper leaf of composite leaf springs are provided at their ends with two attachment elements, and typically two eyelets, which are produced such that their centre is substantially aligned with the axis of the leaf itself, and such that they extend at least partially on both sides of this axis. This type of configuration of the attachment eyelets permits optimum distribution of the forces, but as well as requiring relatively complex processing, in the case of multiple-leaf leaf springs it limits the length of the other leaves (both above and below the one which is provided with eyelets).

The leaves of composite leaf springs are clamped in a set, one on top of another, by means of a central clamping device which also supports the attachment units for the load. In general, this device prevents both relative axial sliding of the leaves (for example by means of one or a plurality of bolts), and relative rotation of the leaves (for example by means of brackets).

For application on commercial vehicles in particular, single-leaf or multiple-leaf leaf springs are made of steel: springs of this type, which are widely used, can support loads which are very heavy, but suffer from the main disadvantage that their weight is considerable.

Single-leaf leaf springs are also known which are made of plastic reinforced with fibre glass, and are much lighter than similar springs made of steel, but the performance of which is not entirely satisfactory; furthermore, it is not possible to render integral with them the attachment eyelets, which must therefore be added on.

SUMMARY OF THE INVENTION

The object of the present invention is thus to provide a leaf spring, in particular for application on commercial vehicles, which is free from the above-described disadvantages, and which in particular is efficient, has a low weight, and is simple and economical to produce.

This object is achieved by the present invention in that it relates to a leaf spring, in particular for a suspension of a vehicle, which comprises a first leaf which is provided at respective ends with corresponding attachment eyelets, and at least one second leaf which is joined to a surface of the said first leaf, characterised in that the said first leaf is made of metal material, and the said second leaf is made of a composite material.

Preferably, the said first leaf is made of steel, and the said second leaf is made of a polymer material reinforced with fibres, of the type such as plastic reinforced with fibre glass, the said eyelets being in this case produced by plastic deformation of the said respective ends of the said first metal leaf.

According to a preferred embodiment, the said attachment eyelets are disposed entirely on one side of a longitudinal axis of symmetry of the said first leaf, on the side opposite the said at least one second leaf, and the said at least one second leaf extends longitudinally with its own respective end edges at least as far as the geometric centres of the said eyelets.

In addition, the leaf spring according to the present invention comprises friction means which are interposed between the said first and the said second leaf, disposed in the vicinity of the said ends of the said first leaf which is provided with the said eyelets, and which friction means extend at least partially below the said eyelets. In particular, the said friction means comprise at least two substantially circular buffers which have a pre-determined thickness and are made of elastomer material, each of the said buffers being provided with at least one coupling tooth which extends perpendicularly in a cantilevered manner from one surface of the said buffer, and can engage a corresponding seat provided in one of the said leaves.

The leaf spring according to the invention additionally comprises means for clamping the said leaves, which means are disposed in the position of the central, flat sections which have a constant thickness of the said leaves, the said clamping means being able to clamp the said leaves in a set against one another; the leaf spring according to the invention also comprises means for angular locking of the said leaves, disposed on at least one side of the said leaves relative to the said clamping means.

By this means a leaf spring is obtained which is simple and economical to produce, and has a low weight, which at the same time can support heavy loads: in fact, the presence of the tangential eyelets, which permits simpler and more economical production of the leaf spring, does not have a negative effect on the performance of the spring itself, since the lower leaf cooperates, by means of the friction means which are interposed between the two leaves, with the upper, metal leaf (which however performs the actual function of supporting the load).

BRIEF DESCRIPTION OF THE DRAWINGS

Further features and advantages of the present invention will become apparent from the following description of a non-limiting embodiment, with reference to the figures of the attached drawing, in which:

FIG. 1 is a lateral view of a leaf spring according to the invention;

FIG. 2 is an enlarged view in cross-section according to the plane II—II in FIG. 1; and FIG. 3 is an enlarged view in cross-section according to the plane III—III in FIG. 1.

DETAILED DESCRIPTION OF THE INVENTION

With reference to FIGS. 1 to 3, 1 indicates as a whole a leaf spring for a suspension of a vehicle, which for the sake of simplicity is not shown.

In the non-limiting example illustrated, the leaf spring 1 is of the "double-leaf" type, comprising a first, upper leaf 2, and a second leaf 3, which is joined to a lower surface 4 of the first leaf 2. The first leaf 2 has a flat central section 5 with a constant thickness, from which there extend on opposite sides respective lateral sections 6, 7, with a thickness which decreases towards respective free ends 8, 9 of the leaf 2 itself; the second leaf 3 also has a flat central section 10 with a constant thickness, and two lateral sections 11, 12 with a decreasing thickness.

According to the present invention, the first, upper leaf 2 is made of metal material, and preferably of steel, whereas the second, lower leaf 3 is made of a composite material, for example of plastic reinforced with fibre glass or another polymer material reinforced with fibres: the leaf 3 is preferably made of polyamide filled with glass fibre and / or talc.

At its own ends 8 and 9, the upper leaf 2 is provided with respective attachment eyelets 15 and 16, which, as is known, are designed for fitting of the leaf spring 1 on the vehicle. According to the invention, the attachment eyelets 15, 16 are disposed entirely on one side of a longitudinal axis of symmetry 50 of the leaf 2, and more specifically on the side opposite the second leaf 3. In the preferred embodiment in which the leaf 2 is made of steel, the eyelets 15, 16 are produced by plastic deformation of the respective ends 8, 9 of the leaf itself.

The fact that the eyelets 15, 16 are produced entirely above the axis 50, contrary to the arrangement for conventional leaf springs, makes it possible to produce the lower leaf 3 such that it extends as far as below the eyelets themselves: in particular, the leaf 3 extends longitudinally with its own respective end edges 13, 14 beyond the geometric centres of the eyelets 15, 16.

With particular reference to FIG. 2, the leaf spring 1 comprises means 52 for clamping the leaves 2, 3, which are disposed in the position of the respective central sections 5, 10 of the latter, and can clamp the leaves against one another in a set. For this purpose, the two leaves 2 and 3 are provided in their respective flat sections 5 and 10 which have a constant thickness, with respective central through holes 17, 18, which are aligned with one another such as to define a single seat 19 for insertion of a bolt 20: the flat sections 5, 10 of the leaves 2, 3 are thus superimposed one on the other, and are connected to one another by means of the bolt 20, such that in use, the leaves 2 and 3 are clamped in a set against one another. A spacer element 31, which is made of elastomer material, is preferably disposed between the flat sections 5 and 10 of the leaves 2 and 3: similarly to the flat sections 5 and 10, the spacer 31 is also provided with a through hole 32, which permits insertion of the bolt 20, such that in use, the spacer 31 is clamped in a set between the leaves 2 and 3.

Additionally, according to the present invention, between the leaves 2 and 3 there are interposed friction means 51, which are designed to distribute the load between the leaves themselves. In particular, the friction means 51 comprise two buffers 21, 22 which are made of elastomer material, which preferably have a substantially circular shape and a pre-determined thickness, each of which is disposed in the vicinity of one of the axial ends 8, 9 of the leaf 2 which is provided with the eyelets 15, 16, and extends at least partially below the eyelets themselves. According to the preferred embodiment illustrated in FIGS. 1 and 3, the buffers 21, 22 are disposed such that their respective end edges 23, 24, which face the side opposite the central bolt 20, are substantially aligned vertically with the geometric centres of the eyelets 15, 16 respectively.

As illustrated in FIG. 3, the buffer 21 is provided on one of its own surfaces 25 which faces the lower leaf 3, with a coupling tooth 27, which projects perpendicularly in a cantilevered manner from the surface 25 itself: the coupling tooth 27, which in this case is cylindrical, can engage in a respective seat 29 defined by a circular (through or blind) hole provided in the lower leaf 3. It will be appreciated that the buffer 22 is also provided with a similar attachment device, which is not illustrated in the figures.

The leaf spring 1 according to the present invention also comprises means 53 for angular locking of the leaves 2, 3, which are disposed on at least one side of the leaves themselves, relative to the central bolt 20. In particular, the angular locking means 53 comprise a bracket 33 which is substantially in the shape of a "U", and is disposed in the vicinity of one of the ends 8, 9 of the leaf 2, and in this case is illustrated in FIGS. 1 and 3 in the vicinity of the end 8. The bracket 33 comprises a base wall 34, from which there extend perpendicularly in a cantilevered manner two lateral walls 35 and 36, which are flat, parallel, and face one another: the leaves 2, 3 are accommodated such that they pass between the lateral walls 35, 36 of the bracket 33, so that one surface 37 of the lower leaf 3, which is opposite the leaf 2, is supported on the base wall 34 of the bracket 33, and the walls 35, 36 prevent relative rotation of the leaves themselves.

The bracket 33 is attached to the lower leaf 3 in a known manner, by means of an appropriate attachment element 38, for example by being riveted.

As already stated, the bracket 33 prevents relative rotation of the leaves 2, 3, whereas the central bolt 20 prevents any axial sliding of the leaves: the presence of the bracket 33, which is disposed in a lateral position relative to the central bolt 20, thus permits use of an extremely simple and economical central attachment device, consisting simply of the central bolt 20, by this means providing a reduction of the number of components, and therefore a low cost.

It will be appreciated that further modifications and variants can be made to the leaf spring according to the invention, without departing from the context of the claims.

For example, in addition to the first leaf which is provided with the attachment eyelets and is made of steel, the leaf spring could comprise a plurality of leaves made of composite material.

In addition, instead of being substantially straight, the leaves can be curved, such that in use, the leaf spring has a pre-determined curvature with concavity which faces the upper leaf.

I claim:

1. Leaf spring for a suspension of a vehicle, comprising:
   a first leaf made of metal material and provided at respective ends with corresponding attachment eyelets;
   at least one second leaf made of a composite material and joined to a surface of said first leaf; and
   friction means interposed between said first leaf and said at least one second leaf, the friction means being disposed in the vicinity of said ends of said first leaf provided with said eyelets, and extending at least partially below said eyelets, said friction means comprising at least two substantially circular buffers having a predetermined thickness and made of elastomer material, each of said buffers being provided with at least one coupling tooth extending perpendicularly in a cantilevered manner from one surface of said buffer, and engagable with a corresponding seat provided in one of said leaves.

2. Leaf spring according to claim 1, wherein said first leaf is made of steel, and said at least one second leaf is made of a polymer material reinforced with fibers, said eyelets being produced by plastic deformation of said respective ends of said first metal leaf.

3. Leaf spring according to claim 1, wherein said attachment eyelets are disposed entirely on one side of a longitudinal axis of symmetry of said first leaf, on the side opposite said at least one second leaf, said at least one second leaf extending longitudinally with its own respective end edges extending at least as far as the geometric centers of the said eyelets.

4. Leaf spring according to claim 1, further comprising means for clamping said leaves, said clamping means being disposed in the position of respective central, flat sections of said leaves having a constant thickness, said clamping means clamping said leaves in a set against one another.

5. Leaf spring according to claim 4, wherein said first and said second leaves are provided in their respective flat central sections having a constant thickness, with respective central through holes aligned with one another to define a single seat for insertion of a bolt, said flat sections of said leaves thus being connected to one another by clamping of said bolt.

6. Leaf spring according to claim 5, further comprising at least one spacer element made of elastomer material and disposed between said flat sections of said leaves, said spacer element also being provided with a through hole for insertion of said bolt.

7. Leaf spring according to claim 6, further comprising means for angular locking of said leaves disposed on at least one side of said leaves relative to said clamping means.

8. Leaf spring according to claim 7, wherein said angular locking means comprise a bracket of substantially U-shape, disposed between a first one of said eyelets and said clamping means, in the vicinity of said first eyelet, said bracket comprising a base wall, from which there extend perpendicularly in a cantilevered manner two lateral walls that are flat, parallel, and face one another, said leaves being accommodated to pass between said lateral walls to limit relative rotation of said leaves, said bracket additionally being provided with an element for attachment to one of said leaves.

9. A leaf spring for a suspension of a vehicle, comprising:
   a first leaf made of metal material and provided at respective ends with corresponding attachment eyelets;
   at least one second leaf made of a composite material and joined to a surface of said first leaf;
   means for clamping said leaves, said clamping means being disposed in the position of respective central, flat sections having a constant thickness of said leaves, said clamping means clamping said leaves in a set against one another; and
   at least one spacer element which is made of elastomer material, said spacer element being disposed between said flat sections of said leaves and clamped between said leaves by said clamping means.

10. A leaf spring according to claim 9, wherein said first leaf and said at least one second leaf are provided in their respective flat central sections having a constant thickness, with respective central through holes aligned with one another to define a single seat for insertion of a bolt, said flat sections of said leaves thus being connected to one another by clamping of said bolt, said at least one spacer element also being provided with a through hole for insertion of said bolt.

* * * * *